United States Patent [19]

Gordon

[11] 4,101,701
[45] Jul. 18, 1978

[54] I.D. CARDS

[75] Inventor: Michael E. Gordon, Wayland, Mass.

[73] Assignee: Polaroid Corporation, Cambridge, Mass.

[21] Appl. No.: 728,311

[22] Filed: Sep. 30, 1976

Related U.S. Application Data

[63] Continuation-in-part of Ser. No. 361,232, May 17, 1973, abandoned, which is a continuation-in-part of Ser. No. 148,768, Jun. 1, 1971, abandoned.

[51] Int. Cl.² .......................... B32B 3/00; B32B 27/06
[52] U.S. Cl. ........................................ 428/189; 40/2.2;
283/7; 283/8 R; 156/228; 156/327; 156/331;
428/192; 428/203; 428/483; 428/916
[58] Field of Search .............. 428/192, 189, 203, 483,
428/211, 916, 500; 283/7, 8 R; 40/2.2; 156/272,
327, 331, 228, 281

[56] References Cited

U.S. PATENT DOCUMENTS

| | | | |
|---|---|---|---|
| 3,148,061 | 9/1964 | Haas | 96/29 |
| 3,581,417 | 6/1971 | Andrews et al. | 283/7 |
| 3,582,439 | 6/1971 | Thomas | 40/2.2 |
| 3,645,823 | 2/1972 | Merk et al. | 156/332 |
| 3,655,494 | 4/1972 | Buzzell | 428/204 |
| 3,716,439 | 2/1973 | Maeda | 40/2.2 |

*Primary Examiner*—George F. Lesmes
*Assistant Examiner*—P. J. Thibodeau
*Attorney, Agent, or Firm*—John P. Morley

[57] ABSTRACT

Novel products including I.D. cards or I.D. credit cards and laminar assemblies useful in preparing same. Essentially, the invention resides in the discovery that a layer comprising specific ethylene copolymers or mixtures thereof and a layer comprising a hydroxylated polymer can function as especially effective heat-activatable adhesive systems for such products. The invention also presents processes for I.D. cards and I.D. credit cards.

2 Claims, 5 Drawing Figures

I.D. CARDS

CROSS REFERENCE TO RELATED APPLICATIONS

This application is a continuation-in-part of U.S. patent application Ser. No. 361,232 filed May 17, 1973 and now abandoned which in turn is a continuation-in-part of U.S. patent application Ser. No. 148,768 filed June 1, 1971 and now abandoned.

BACKGROUND OF THE INVENTION

1. The Field of the Invention

This invention relates to laminar structures. More precisely, the invention disclosed herein relates to I.D. cards, I.D. credit cards and laminar assemblies useful in their preparation.

2. Description of the Prior Art

I.D. cards or badges and I.D. credit cards are known products of commerce and their performance characteristics are well defined. Essentially, such products must be capable of being conveniently handled, but be durable and resistant to wear, heat, cold, sunlight, ultraviolet light, moisture and other conditions. Additionally, they must provide identifying information which is readily available to one examining the card and which is sufficient to provide a reasonable degree of assurance that the person presenting the card is the legitimate holder thereof. Both I.D. cards and I.D. credit cards routinely include security features the most common of which is a security seal, e.g., a seal which cannot be easily broken without revealing evidence of the attempted intrusion.

Although not essential in the case of I.D. cards, I.D. credit cards also provide a capability for storing information other than that relating to the identity of the bearer. For example, I.D. credit cards, oftentimes, include information for recording transactions in which the card is used. Generally, such information is stored in one of the layers of the I.D. credit card is embossed form or in the form of a plurality of punched holes.

In addition to the above-described performance characteristics, the methods or processes for producing of assembling I.D. cards and/or I.D. credit cards should be simple, rapid and convenient involving a minimum of manipulative steps all of which can be accomplished in a relatively routine, day-to-day fashion without the requirement of specialized knowledge on the part of the assembler. Since the issuance of I.D. cards and I.D. credit cards requires the intended bearer of the card to come to a photographic station of the issuer, an ideal feature in producing and assembling the card involves the issuance of the card directly to the intended bearer at the station.

Many of the known methods for producing I.D. cards and/or I.D. credit cards involve the use of heat-activatable adhesive systems which are considered especially convenient since they can provide excellent security seals by simple, but rapid manipulations. The heat-activatable adhesive system can be coated directly on the information-bearing surface of the I.D. card before assembly, e.g., a pouch or similar assembly structure which will be described in more detail hereinafter. In any event, the I.D. card is inserted between the layers of a laminar assembly and the heat-activatable adhesive system is activated such as in a platen press, roll laminator or like device to provide an effective security seal for the final product.

The selection of a particular heat-activatable adhesive system is not without attendant problems and the suitability of such systems in this application must be determined empirically. For example, the heat-activatable system must be one which can be activated at a temperature which does not adversely affect the dimensional stability of the final product and/or components thereof. Also, the system must be one which will not adversely affect the color or definition of the information on the information-bearing surface of the I.D. card. The present invention is addressed to laminar assemblies and to I.D. cards and I.D. credit cards produced therefrom which manifest a uniformly high degree of quality in those performance characteristics required of such products by the art and which further permit rapid assembly of such products so that they can be made available almost immediately to the intended bearer.

SUMMARY OF THE INVENTION

In accordance with one aspect of the present invention novel laminar assemblies useful in the preparation of I.D. cards and credit cards are presented to the art. In accordance with another aspect of the present invention, novel I.D. cards and/or I.D. credit cards employing the above-mentioned laminar assemblies as well as processes for producing such cards are presented. Essentially, the essence of the present invention resides in the discovery that layers comprising an ethylene acrylic acid copolymer and/or an ethylene ethyl acrylate copolymer can be combined with a layer comprising a mixture of polyvinyl alcohol and polyvinylpyridine to provide an especially effective heat-activatable adhesive system for laminar assemblies used in the preparation of I.D. cards and/or credit cards. One of the outstanding advantages of the adhesive system of the laminar assemblies of the present invention is that the use of a layer containing a mixture of polyvinyl alcohol and polyvinylpyridine together with the ethylene copolymer layer can provide an effective security heat seal for I.D. photographs having moist surfaces. As will be shown in the Examples, in the absence of a layer containing a mixture of polyvinyl alcohol and polyvinylpyridine, the surfaces of the I.D. photograph must be substantially dry in order to consistently assure uniformly high-quality security heat seals between the surface of an I.D. photograph and a heat-activatable adhesive layer comprising an ethylene copolymer.

DESCRIPTION OF THE PREFERRED EMBODIMENTS

The preferred embodiments of the present invention include I.D. cards and I.D. credit cards having a color diffusion transfer print which is completely enclosed by two sheets fabricated of polyester sealed together about their periphery and having the image-bearing surface of the print securely laminated to the inner surface of one polyester sheet with the other surface of the print bonded to the inner surface of the other polyester sheet.

A particularly useful photographic procedure for forming the color print is described and claimed in the aforementioned U.S. Pat. No. 2,983,606. In such a procedure, a photosensitive element including at least one light-sensitive silver halide emulsion and associated layer of dye developer (dye which is also a silver halide developing agent) is exposed to provide a developable image; the thus exposed element is contacted with an aqueous alkaline processing composition to develop the image and as a function thereof to form an imagewise distribution of mobile and diffusible dye; and this imagewise distribution is then transferred, at least in part, by imbibition, to a superposed image-receiving element comprising a dyeable stratum to impart thereto a positive dye transfer image of the original subject matter.

The image-receiving element used in these processes generally comprises an opaque or transparent support coated with an image-receiving layer of a dyeable material which is permeable to the alkaline processing composition. The dyeable material may comprise polyvinyl alcohol together with a polyvinylpyridine polymer such as a poly-4-vinylpyridine polymer. Such image-receiving elements are further described in U.S. Pat. No. 3,148,061 issued to Howard C. Haas.

Figure 1:
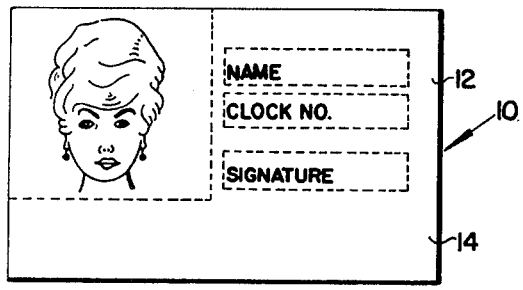
FIG. 1 is a plane view of one format of color print contemplated for use in the practice of this invention.

A typical I.D. photograph of the preferred embodiments of the present invention is shown in FIG. 1 where it will be seen that the diffusion transfer print 10 comprises an image-containing layer 12 on a suitable support 14 of paper or the like. As those in the art know, diffusion transfer prints can contain other layers such as neutralizing layers and timing layers positioned between the image-receiving layer and the support, but these are not essential to the invention and have not been shown. In layer 12, a photographic likeness of the individual appears at one portion of the print and the desired descriptive matter is contained at another portion. The descriptive indicia may be supplied by any desired means, e.g., typing, but is preferably a part of the photograph.

A preferred system for preparing print 10 utilizes the aforementioned color diffusion transfer procedures. A data card containing the desired descriptive information is inserted into the camera so that both the subject and the descriptive matter pertaining to him are simultaneously photographed to provide a single developable image which is thereafter processed in the aforementioned manner to provide print 10. This may be accomplished most expeditiously with the camera of the Polaroid ID-2 or ID-3 Land Identification System.

Figure 2:
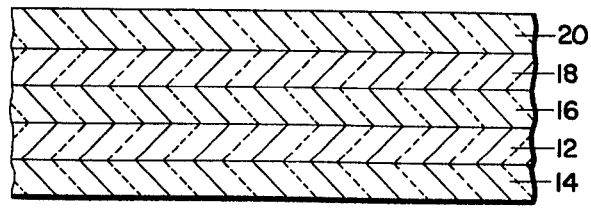
FIG. 2 is a diagrammatical sectional view, greatly magnified, of one product contemplated by this invention.

In the simplest embodiment of the invention a laminar structure is prepared as shown in FIG. 2. As shown therein, the laminar structure comprises a color print, e.g., as shown in FIG. 1, comprising a suitable support 14 for stratum 12 containing the color image. Stratum 12 is bonded to a substantially transparent layer 16 of a mixture of polyvinyl alcohol and a polyvinylpyridine which is bonded to layer 18. Layer 18 can comprise either a heat-activatable adhesive containing ethylene acrylic acid copolymer of an ethylene ethyl acrylate copolymer or mixture thereof. As shown, layer 18 is in turn bonded to a polyester sheet 20 providing the protective overlay, e.g., a sheet of rigid or semirigid polyester. Sheet 20 together with support 14 preferably provides the requisite strength and rigidity to maintain the planar shape of the card and to prevent damage due to bending, folding, etc.

As examples of suitable heat-activatable adhesives of ethylene acrylic acid copolymers or ethylene ethyl acrylate copolymers contemplated for use as layer 18, mention may be made of ethylene acrylic acid and ethylene ethyl acrylate copolymers wherein the percent acrylic acid or ethylene ethyl acrylate in the respective copolymers is preferably from about 5 to about 20 percent. The melt index of contemplated ethylene acrylic acid or ethylene ethyl acrylate copolymers as measured in accordance with the other can vary over a rather wide range; for example, between 1:10 or lower to 10:1 or higher. The copolymer and/or mixture thereof is normally extruded in the form of a layer or film on the surface of the polyester sheet material and usually a urethane or polyester adhesive is employed to bond the layer or film to the surface of the polyester sheet material. Products having the above-described copolymers in the form of a layer or film bonded to the surface of a polyester sheet material are commercially available. For example, a product designated as Laminating Film 14A and supplied by General Binding Corporation comprises a layer of an ethylene ethyl acrylate copolymer bonded to the surface of a polyester sheet. Also, a product designated as Dow Overlaminating Film PZ 5557.08 and supplied by Dow Chemical Company comprises a layer of an ethylene acrylic acid copolymer bonded to the surface of a polyester sheet.

As mentioned, the preferred polymers of layer 16 are mixtures of polyvinyl alcohols with polyvinylpyridines especially a poly-4-vinylpyridine.

Sheet 20 providing the protective overlay preferably may comprise any of the polyesters which are the reaction products of the polymerization of ethylene glycols with polycarbocyclic acids. Polyethylene terephthalate sheet materials such as "Mylar" or "Melinex" have been found to provide especially desireable transparent overlays due to the strength, flexibility and antiabrasion nature of such materials.

A card such as shown in FIG. 2 protects the front or image-bearing surface of the print and to this extent is satisfactory for many purposes. However, the preferred embodiment of the invention contemplates completely encasing the card for greater protection and for other reasons which will be discussed hereinafter.

Figure 5:
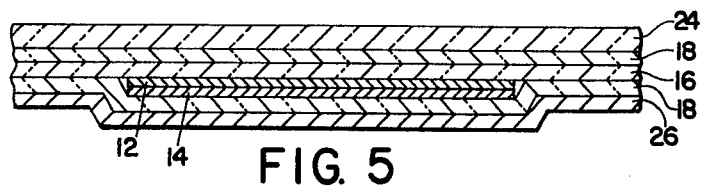
FIG. 5 is a diagrammatical sectional view of a product contemplated by this invention formed by inserting an I.D. photograph into laminar assembly of FIG. 3 and then heat sealing.

In the preferred embodiment, rear wall member 26 (FIGS. 3 and 5) is a polyester sheet which can be of the same or of a different thickness than front member 24. For example, in the case of an I.D. card, members 24 and 26 are usually of the same thickness while in the case of I.D. credit cards member 26 is somewhat thicker so that information can be embossed or otherwise included thereon. Unlike front wall member 24, member 26 need not be transparent and can be opaque, e.g., it can contain a white pigment or some other colorant. The inner surface of rear wall member 26 is also provided with a coating of an ethylene acrylic acid copolymer or an ethylene ethyl acrylate copolymer and after the I.D. card is inserted between members 24 and 26, the laminar assembly is sealed in manners well known to the heat-sealing art. For example, the assembly may be sealed by passing it through a pair of heated pressure rollers. FIG. 5 is a diagrammatical sectional view showing the final I.D. card after completing the bonding and sealing.

Figure 3:
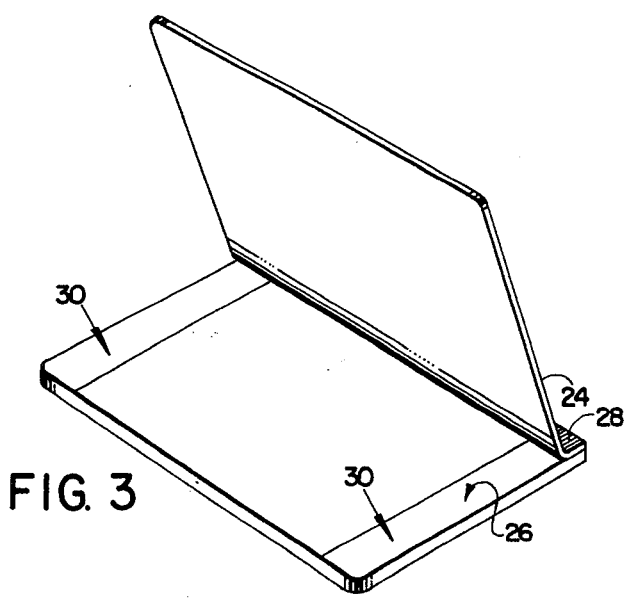
FIG. 3 is a perspective view of a laminar assembly especially preferred in preparing I.D. cards or I.D. credit cards.

The preferred method for encasing the card involves the use of a laminar assembly of the type shown in FIG. 3. As shown there, an assembly is provided comprising a front wall member 24 and a rear wall member 26 coupled together along one edge 28 such as by a bar seal or spot welds. The inner surface of front wall member 24 is provided with the layers for laminating, e.g., layer 18 overcoated with layer 16 as heretofore described while the inner surface of rear wall member 26 is also provided with a layer 18.

An I.D. card and/or I.D. credit card may be prepared by pressing the moist surface of the I.D. card against the inner surface of front wall member 24, and then bringing the respective front and back members into superposition and heat sealing such as in a platen press or roll laminator. The front and back members are preferably somewhat larger in dimensions than the print, so that a peripheral area of the superposed members free from contact with the print may be bonded together by the adhesive coating to perfect a tight seal. Also in the preferred blanks, registry means are provided so that the I.D. card can be quickly and conveniently placed in the proper position between wall members 24 and 26. For example, as shown in FIG. 3, scribe marks 30, 5 mils. wide and 3 mils. deep are provided on the surface of 26 and together with the edge of the heat seal along 28 aid in aligning the I.D. card in the desired position between members 24 and 26. Scribe marks of the type described above fuse upon heating of the laminate and are virtually invisible in the final laminar assembly. After aligning the I.D. card in the desired position and pressing the inner surface of member 24 against the moist surface of the card, any shifting of the aligned card is prevented because of the adhesion between the inner surface of member 24 and the surface of the card communicating therewith.

A final I.D. card employing the assembly of FIG. 3 is shown in FIG. 5. As can be seen there, layer 16 provides adhesion between the surface of layer 12 and layer 18 located above layer 16. Also, layer 16 provides adhesion between layers 18 at the peripheral portions of the blank surrounding the color print shown as layers 12 and 14.

Figure 4:
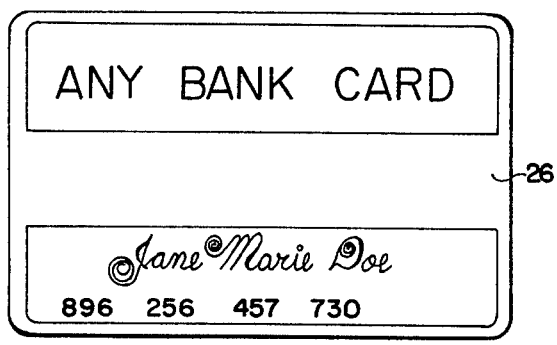
FIG. 4 is a plane view showing a typical design and structure which the rear wall of a product such as shown in FIGS. 3 or 5 may take.

In the embodiments shown in FIGS. 3 and 4, the rear wall member may be provided with suitable indicia and/or design pertaining to the issuer and/or bearer. This descriptive matter may be supplied in whole or in part prior to or subsequent to sealing. It may also contain identifying matter in the form of embossing or coded hole-punching (an example of the latter being the so-called Hollerith card) which may be employed with known devices for recording purchases, billing or other bookkeeping matters.

FIG. 4 shows a typical form which the outer surface of the rear wall member may take. It may, for example, include a characteristic design in color of the issuer, the name of the issuer, and the name and an identifying serial number of the bearer in embossed lettering. As was mentioned previously, hole-punching of coded indicia may be employed in lieu of embossing.

The bond provided by the present invention has been found to be especially strong and cannot be broken without destruction of the color print. For example, where known means of separation were attempted, e.g., even with the aid of a razor blade, the image-containing layer separated along with the protective overlay, i.e., separated from the support for the print. It will thus be seen that the present invention provides an excellent security seal which can withstand attempts by known methods to separate the image-bearing surface from the bonding layer. In products such as shown in FIG. 5, the print is securely affixed between the respective front and back members. In addition to providing a security seal not obtainable when the print is not so secured within the walls, the resulting product is capable of use in Hollerith card-type operations, whereas a card containing a moveable print is not.

In the foregoing description, reference has been made to bonding the surface of the print to a layer of a mixture of polyvinyl alcohol and polyvinylpyridine, e.g., layer 16. This layer may contain other ingredients performing specific desired functions in addition to bonding. It may, for example, also include antioxidants, ultraviolet light absorbers, (fluorescent inks for security features) etc. to protect the color print, e.g., to increase its stability against fading to the degradative effects of heat, light and/or moisture.

The following examples further serve to illustrate the practice of this invention:

EXAMPLE 1

Laminating Film 14A is supplied by General Binding Corporation and comprises a sheet of clear polyester approximately 2 5/16 × 3¼ inches having a layer of a heat-activatable adhesive comprising ethylene ethyl acrylate copolymer coated on one surface thereof. An aqueous acidic (2% by volume) dispersion of a 2:1 mixture of polyvinyl alcohol: poly-4-vinylpyridine (total solids 7%) was coated on the heat-activatable adhesive layer to provide a uniform coating when dry of 0.8 mils. thick.

EXAMPLE 2

Overlaminating Film PZ 5557.08 is supplied by Dow Chemical Company and comprises a sheet of clear polyester approximately 2 5/16 × 3¼ inches having a layer of a heat-activatable adhesive comprising ethylene acrylic acid copolymer coated on one surface thereof. An aqueous acidic (2% by volume) dispersion of a 2:1 mixture of polyvinyl alcohol: poly-4-vinylpyridine (total solids 7%) was coated on the heat-activatable adhesive layer to provide a uniform coating when dry of 0.8 mils. thick.

EXAMPLE 3

A sheet prepared in the manner described in Example 1 was placed in superposition with a sheet of Laminating Film 14A and heat-sealed along one edge to provide a laminar assembly as shown in FIG. 3.

EXAMPLE 4

Polacolor Type 108 Land film was inserted into the No. 926 Land Identification System. A data card was then inserted and this card and the subject were simultaneously photographed to provide a developable image on the photosensitive element of the film. The exposed photosensitive element was then pulled from the camera while in superposition with the image-receiving element of the film, the two elements were maintained in superposition outside the camera for approximately 60 seconds and then separated to reveal a positive multicolor transfer image.

EXAMPLE 5

The image-bearing surface of a color print as prepared in Example 4 was heat-sealed while still moist from processing against a polyester overlay prepared as in Example 1 to provide a tight lamination as shown in FIG. 2.

EXAMPLE 6

The image-bearing surface of a color print as prepared in Example 4 was heat-sealed while still moist from processing against a polyester overlay prepared as in Example 2 to provide a tight lamination as shown in FIG. 2.

EXAMPLE 7

A color print as prepared in Example 4 was inserted while still moist into a laminar assembly prepared as in Example 3 with the image-bearing surface against the layer comprising the mixture of polyvinyl alcohol; poly-4-vinylpyridine. The adhesive coating and the respective sheets were brought into superposition and passed through a pair of heated opposed, pressure rollers to effect sealing to provide an I.D. card as shown in FIG. 5.

EXAMPLE 8

The seal of the structures prepared above was found to be of uniformly high-quality which was consistently reproduced in each preparation. Moreover, the strength of the bonding of the print to the polyester sheet was tested with laminar structures as prepared above. In these tests, attempts were made to sever the print from the polyester with or without the aid of a razor blade. In all instances, the image-bearing surface separated from its support and remained tightly adhered to the polyester sheet.

EXAMPLE 9

Two sheets of Laminating Film 14A were placed in superposition and heat-sealed along one edge to provide a laminar assembly of FIG. 3. The image-bearing surface of a color print as prepared in Example 4 was inserted—while still moist—between the surfaces of the sheets containing the heat-activatable adhesive coating and the laminar assembly was heat-sealed by passing the assembly through a pair of heated rollers.

Upon examination, the overall quality of the seals of laminar structures prepared without the use of the layer of the mixture of polyvinyl alcohol and poly-4-vinylpyridine were found to be of nonuniform quality especially in those areas where the moist surface of the print was applied to the overlay. In contrast thereto, the laminar assemblies of the present invention consistently assured uniform, high-quality security seals immediately for laminar products employing the assemblies to laminate moist I.D. diffusion transfer photographs.

EXAMPLE 10

Substantially, the same results in terms of quality of seal were obtained in repeating the procedure of Example 9 using two sheets of Overlaminating Film PZ 5557.08.

Many modifications of the features of the above Examples offered for the purpose of illustrating the invention can be made without departing from the spirit and scope of the invention defined in the appended claims. For example, it is to be especially understood that heat-activatable adhesive layers comprising ethylene ethyl acrylate copolymers or mixtures thereof with the ethylene acrylic acid copolymers of the Examples can be coated with the mixtures of polyvinyl alcohol and polyvinylpyridine to provide assemblies which can effectively heat-seal moist I.D. cards in the manner illustrated. Also, the layers can be coated in manners known to the art such as brushing, spraying or by printing techniques some of which can be employed to apply preselected patterns of the layer of the mixture of polyvinyl alcohol and polyvinylpyridine to heat-activatable adhesive layer.

Since certain changes may be made in the above product and process without departing from the scope of the invention herein involved, it is intended that all matter contained in the above description or shown in the accompanying drawing shall be interpreted as illustrative and not in a limiting sense.

I claim:

1. An I.D. card laminar structure including a transparent polyester front sheet the inner surface of which is provided with a first layer of a heat-activated adhesive comprising an ethylene acrylic acid copolymer or an ethylene ethyl acrylate copolymer or mixtures of these and a second layer comprising a mixture having a ratio of about 2:1 of polyvinyl alcohol and poly-4-vinylpyridine; a diffusion transfer photograph of smaller dimensions than said sheet material and having a dye image containing receiving layer comprising a mixture of polyvinyl alcohol and poly-4-vinylpyridine, said photograph being substantially centered on said front sheet, with the image receiving layer bonded to said front sheet through said two layers, leaving a peripheral area of said front sheet free from contact with said photograph, a back sheet of substantially the same dimensions as said front sheet having thereon a layer of a heat-activated adhesive comprising an ethylene acrylic acid copolymer or an ethylene ethyl acrylate copolymer or mixtures thereof and peripheral areas of said front and back sheets being sealed together to complete said lamination.

2. A process for preparing an I.D. card which comprises the steps of:
   a. providing a laminar assembly comprising a first polyester sheet material and a second polyester sheet material both sheet materials having substantially the same dimensions and wherein said first sheet is substantially transparent and the inner surface has coated thereon a first heat-activatable adhesive layer comprising an ethylene acrylic acid copolymer, an ethylene ethyl acrylate copolymer or mixtures of these, and a second layer comprising a mixture having a ratio of about 2:1 of polyvinyl alcohol and poly-4-vinylpyridine, and the inner surface of said second sheet has coated thereon a heat-activatable adhesive layer comprising an ethylene acrylic acid copolymer, an ethylene ethyl acrylate copolymer or mixtures of these;
   b. providing a diffusion transfer photograph of smaller dimensions than said sheet materials, said photograph having a dye image containing image-receiving layer comprising a mixture of polyvinyl alcohol and poly-4-vinyl pyridine, said image-receiving layer having a moist surface;
   c. bonding the moist surface of said image-receiving layer to said second layer of said first sheet material by positioning said moist surface of said photograph against said second layer of said first sheet material so that a peripheral area of said second layer is free from contact with said photograph;

d. superposing said second sheet material on said first sheet material with said heat-activatable layer of said second sheet material against the back of said photograph; and, e. heat laminating said sheet materials and said photograph together to thereby provide an I.D. card having said image-receiving layer bonded to said second layer of said first sheet material and peripheral areas of the first and second sheet materials bonded to each other.

* * * * *